United States Patent
Kozlowski (10) Patent No.: US 9,930,401 B2
(45) Date of Patent: Mar. 27, 2018

(54) WIFI VIDEO BRIDGE CIRCUIT IN QOS

(71) Applicant: EchoStar Technologies L.L.C., Englewood, CO (US)

(72) Inventor: Anthony Kozlowski, Monument, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 13/732,269

(22) Filed: Dec. 31, 2012

(65) Prior Publication Data

US 2014/0189758 A1  Jul. 3, 2014

(51) Int. Cl.
*H04N 7/18* (2006.01)
*H04N 21/4363* (2011.01)
*H04W 28/26* (2009.01)
*H04W 92/18* (2009.01)

(52) U.S. Cl.
CPC ...... *H04N 21/43637* (2013.01); *H04W 28/26* (2013.01); *H04W 92/18* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,865,193 | B2 * | 1/2011 | Lin et al. | 455/453 |
| 8,069,465 | B1 * | 11/2011 | Bartholomay et al. | 725/116 |
| 8,131,303 | B2 * | 3/2012 | Cook | H04M 11/062 370/328 |
| 2005/0042999 | A1 | 2/2005 | Rappoport | |
| 2006/0053452 | A1 * | 3/2006 | Lee | H04L 12/40117 725/81 |
| 2009/0064250 | A1 * | 3/2009 | Nakata | H04L 1/0018 725/109 |
| 2009/0070468 | A1 | 3/2009 | Ohta | |
| 2009/0296000 | A1 * | 12/2009 | Pal | H04N 7/165 348/725 |
| 2010/0182959 | A1 | 7/2010 | Cook et al. | |
| 2011/0032883 | A1 | 2/2011 | Patil et al. | |
| 2012/0147268 | A1 * | 6/2012 | Hassan | H04B 1/69 348/552 |
| 2012/0201255 | A1 * | 8/2012 | Manor | H04N 21/2385 370/468 |

FOREIGN PATENT DOCUMENTS

CN  102547461 A  7/2012

* cited by examiner

*Primary Examiner* — Alexander Gee
(74) *Attorney, Agent, or Firm* — Seed IP Law Group LLP (57) ABSTRACT

A first television receiver provides media content wirelessly to a second television receiver. The first television receiver transmits video data to the second television receiver on a first wireless network. The television receiver transmits other kinds of data to the second television receiver on a second wireless network.

10 Claims, 5 Drawing Sheets

WIFI VIDEO BRIDGE CIRCUIT IN QOS

BACKGROUND

Technical Field

The present disclosure relates to the field of wireless networks. The present disclosure relates more particularly to the field of wireless networks implemented in conjunction with television receivers.

Description of the Related Art

A wireless bridge circuit can be used to allow one electronic device to wirelessly communicate with another electronic device by implementing a wireless network connecting two devices. Data can be passed between the two electronic devices wirelessly.

Wireless bridge circuits have limited data bandwidths. In some cases, multiple types of data are sent over the wireless network between the two electronic devices. One type of data can be more important than another type of data. When the bridge circuit's bandwidth is full, one type of data may need to be given priority over another type of data.

BRIEF SUMMARY

One embodiment is a method for wirelessly transmitting data from a bridge circuit having limited bandwidth while giving priority to one type of data over another. In one embodiment a wireless bridge circuit wirelessly transmits data to an electronic device. The wireless bridge circuit transmits data to the device on two separate wireless networks. One of the wireless networks is reserved for data of a first type while the other wireless network is reserved for data of second type. The first type of data is more sensitive to delay or disruption than the second type. The wireless bridge circuit provides a higher priority to the wireless network transmitting the first data type. In this way, when the wireless bridge circuit is using most of its bandwidth, the first wireless network will be given bandwidth at the expense of the second wireless network so that transmission of the first data type is not interrupted.

In one embodiment the wireless bridge circuit is connected to a first television receiver. The wireless bridge circuit transmits video content and other data from the first television receiver to a second television receiver. The second television receiver displays the video content on a display. The wireless bridge circuit transmits video content to the second television receiver on the first wireless network. The wireless bridge circuit transmits other types of data to the second television receiver on the second wireless network. Because the quality of a video program is greatly impacted by any delay in the transmission of the video data, the first wireless network is given bandwidth priority over the second wireless network.

Thus, if a user of the second television receiver is viewing a television program on the display, the television program data transmitted from the first television receiver will not be interrupted or delayed due to large amounts of other kinds of data being transmitted on the second wireless network. The quality of television programs and other types of video content will be preserved at the expense of other types of data.

DETAILED DESCRIPTION

Figure 1:
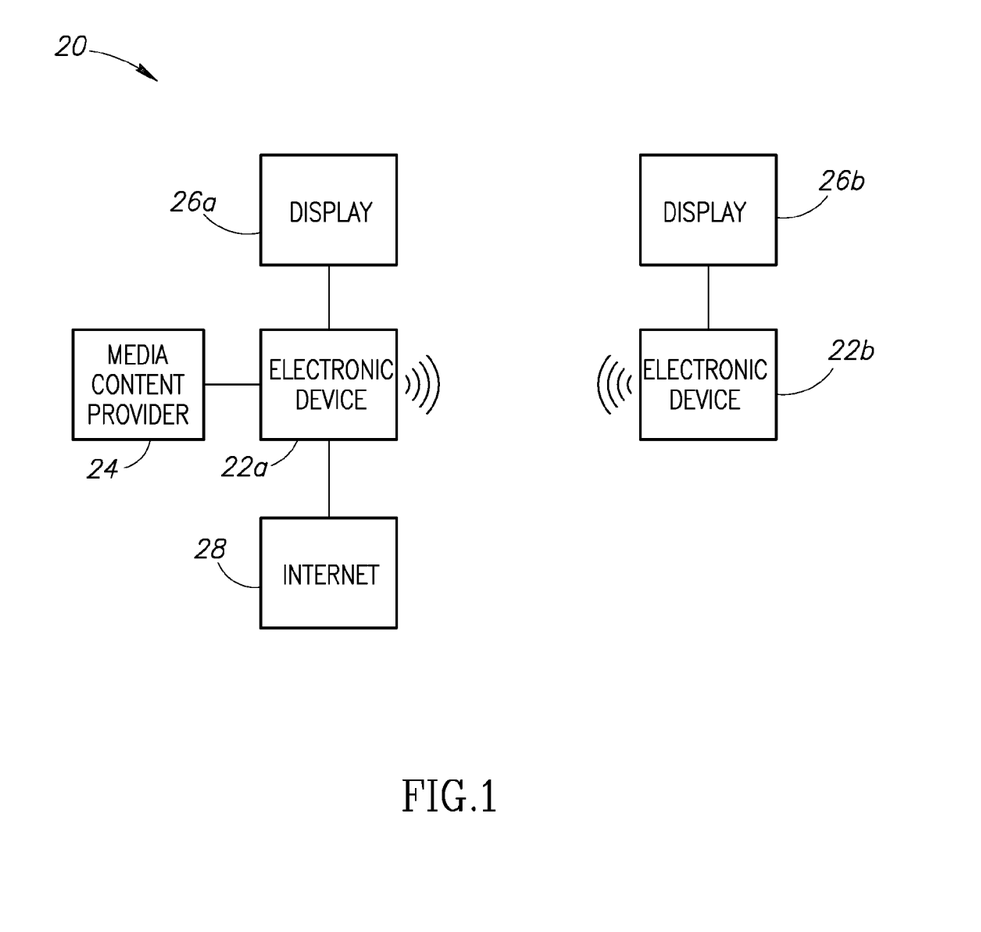
FIG. 1 is a block diagram of a media content delivery system according to one embodiment.

FIG. 1 is a block diagram of a media content delivery system 20 according to one embodiment. The media content delivery system 20 includes a first electronic device 22a. The electronic device 22a is coupled to a media content provider 24, a display 26a, and the Internet 28. The media content delivery system 20 further includes a second electronic device 22b coupled to a second display 26b.

The electronic device 22a receives media content or other data from a media content provider 24. The electronic device 22a also receives Internet data from the Internet 28. The electronic device 22a can display images or video received from the media content provider 24 or the Internet 28 on the display 26a.

Electronic device 22a is configured to wirelessly transmit data from the media content provider 24 and the Internet 28 to the electronic device 22b. Electronic device 22b can display video, images, or other data received from the electronic device 22a on the display 26b. Many types of data such as video data, image data, text data, email data, software data, and other types of data can be transmitted from the electronic device 22a to the electronic device 22b.

The electronic device 22a has limited data bandwidth. The electronic device 22a cannot transmit data beyond a certain data rate. Therefore, if the electronic device 22a is transmitting a high volume of data to the electronic device 22b, some data can be delayed or interrupted. Some kinds of data can be delayed or interrupted without adversely affecting the electronic device 22b or the experience of the user using the electronic device 22b. Other kinds of data are particularly sensitive to delay or interruption. Such delays or interruptions can adversely affect the function of the electronic device 22b or the experience of the user using the electronic device 22b.

To alleviate delays or interruptions that can adversely impact the function of the electronic device 22b, and the experience of the user using the electronic device 22b, electronic device 22a is configured to give bandwidth priority to certain kinds of sensitive data at the expense of other kinds of less sensitive data. Wirelessly transmitted data is commonly sent according to packet-switched protocols. It is possible to tag each data packet sent between the electronic devices 22a, 22b with priority indicators. In this case electronic devices 22a, 22b will sort each packet to determine the priority of the individual packets so that packets with a higher priority tag can be given bandwidth priority over packets with lower priority tags. However, this can require more processing resources to tag each data packet in this way. This can both increase the expense of the electronic devices 22a, 22b and can also introduce other delays in interruptions.

Accordingly, in one embodiment, electronic device 22a is configured to transmit data to the electronic device 22b on two different wireless networks. Electronic devices 22a, 22b are, therefore, wirelessly connected to each other on two separate wireless networks. The first wireless network can be reserved for sending data types having a higher priority. The second wireless network can be reserved for sending data types having a lower priority.

Electronic devices 22a, 22b are configured to give bandwidth priority to the first wireless network. If a high data volume is being transmitted between the electronic devices 22a, 22b and the data rate bandwidth is nearing maximum capacity, electronic devices 22a, 22b automatically sacrifice the bandwidth of the second wireless network in favor of the first wireless network. If data is being transmitted across first and second wireless networks, the second wireless network is only given the bandwidth remaining after sufficient bandwidth has been allocated to ensure that the first wireless network can handle the high priority data without introducing delays or interruptions.

Wireless networks are typically identified by a unique serial set identifier (SSID) or other type of identifier identifying the wireless network. Each data packet is typically tagged to identify the SSID of the wireless network over which it is being transmitted. The electronic devices 22a, 22b are capable of establishing two separate wireless networks each with a unique SSID. As each data packet transmitted over a wireless network is already typically tagged with an SSID, the data packets can be transmitted over the two wireless networks without additionally tagging each data packet with a priority tag. Instead the electronic devices 22a, 22b on allocated bandwidth priority to one wireless network over the other. Thus there is no extra tagging of the data packets to indicate priority. This allows data to be transmitted from the electronic device 22a to the electronic device 22b in a very efficient manner without adding additional data which uses further bandwidth.

In one embodiment, the electronic device 22a receives data both from the Internet 28 and the media content provider 24, and provides this data to the electronic device 22b. This can include numerous types of data. In one example data types such as video streaming or high priority system update data can be transmitted over the higher priority wireless network, while data such as text messages, email, or low priority software updates can be sent over the lower priority second wireless network. Because the first wireless network has bandwidth priority over the second wireless network, the higher priority data will not be delayed or interrupted due to the lower priority data.

The electronic devices 22a, 22b are television receivers. The television receiver 22a transits media content data such as television programs to the television receiver 22b. The television receiver 22b receives the media content and displays the media content on the display 26b. Because the quality of television viewing decreases sharply if there are delays or interruptions in a television program while it is being displayed, video data from the television receiver 22a is sent over the high priority first wireless network. Other data such as programming guide data or other kinds of lower priority data can be sent over the second wireless network. In this way a user using a television receiver 22b can view video content without disruption due to a high volume of lower priority data being transmitted.

Alternatively electronic devices 22a, 22b can include handheld devices such as smart phones, gaming devices, tablets, or other types of handheld devices. Electronic devices 22a, 22b to be can further include laptop computers, desktop computers, televisions, and other devices.

FIG. 1 depicts the electronic device 22a as a single device transmitting data to the electronic device 22b. However, in practice the electronic device 22a may be coupled to a first wireless bridge circuit. The electronic device 22a provides data to the first wireless bridge circuit which transmits the data to the electronic device 22b.

Likewise, the electronic device 22b may be coupled to a second wireless bridge circuit which receives data from the first wireless bridge circuit. The second wireless bridge circuit also sends data to the first wireless bridge circuit. In this way data from the first electronic device 22a can be wirelessly transmitted to the electronic device 22b by utilizing respective wireless bridge circuits coupled to electronic devices 22a, 22b.

Alternatively electronic device 22a can have a first wireless bridge circuit incorporated therewith such that the first wireless bridge circuit is part of the electronic device 22a. Likewise the electronic device 22b can have a second wireless bridge circuit incorporated there with such that the second wireless bridge circuit is part of the electronic device 22a.

FIG. 1 shows electronic device 22a the connected to media content provider 24, the Internet 28, and the display 26a. However, this is given only by way of example. In some embodiments the electronic device 22a is connected to more or fewer devices or data sources. Likewise, the electronic device 22b may be connected to more devices than just the display 26b. Electronic device 22b may also be connected to other devices or data sources.

Figure 2:
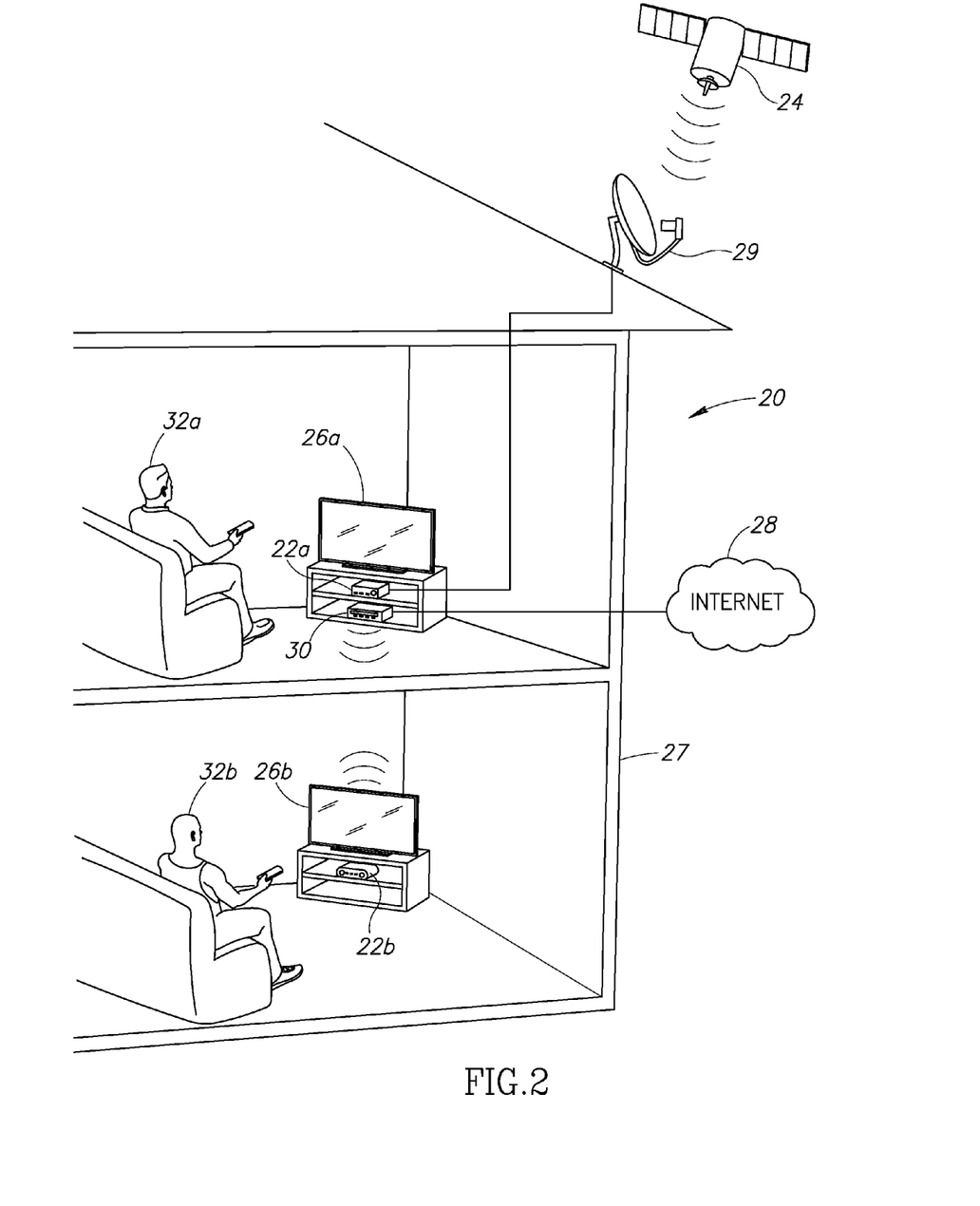
FIG. 2 illustrates a home including wirelessly communicating set top boxes according to one embodiment.

FIG. 2 illustrates a media content distribution system 20 according to one embodiment. The media content distribution system includes a satellite transponder 24, the satellite dish 29, and a first television receiver 22a coupled to the satellite dish 29. The media content distribution system 20 further includes a wireless bridge circuit 30 and a television 26a coupled to the first television receiver 22a. A second television receiver 22b is wirelessly coupled to the first television receiver 22a through the wireless bridge circuit 30. The second television 26b is coupled to the television receiver 22b. A first user 32a operates the first television receiver 22a. A second user 32b operates the second television receiver 22b.

The satellite transponder 24 provides media content data to the satellite dish 29. The media content data includes television program data carried on various television channels, identification and encoding data, program guide data, and many other kinds of data. The television receiver 22a receives the media content data from the satellite dish 29. The television receiver 22a can tune into a television channel to display television programs on the television 26a. The television receiver 22a also can receive other kinds of video content from the satellite dish 29 which can be displayed on the television 26a.

The first television receiver 22a wirelessly transmits media content data to the second television receiver 22b through the wireless bridge circuit 30. The user 32b uses a remote control to operate the television receiver 22b. The television receiver 22b is operated by the user in a manner similar to how the user 32a operates the television receiver 22a. The user 32b can view a programming guide on the television 26b and can select a media content channel to view on the television 26b. The programming guide data is received wirelessly by the second television receiver 22b from the first television receiver 22a.

In one embodiment, one or both of the second television receiver 22b and the television 26b can be used to download information from the Internet 28. For example, some televisions allow a user to type emails and to surf the web by connecting the television to the Internet. Television 26b can be connected to the television receiver 22b by an ethernet cable in addition to a video output cable which commonly connects a television receiver to a television. The television receiver 22b can connect to the Internet 28 via the wireless bridge circuit 30. The wireless bridge circuit 30 can therefore transmit Internet data to the television receiver 22b in addition to the media content data which is transmitted to the television receiver 22b.

If the user 32b is watching the video program on the television 26b while also downloading data from the Internet 28 or from the media content provider 24, it is possible that the wireless bridge circuit 30 can reach its maximum bit rate bandwidth. If the data is not managed properly, it is possible that the television program can be delayed or interrupted. This can result in unwanted pixilation of the television program, a decrease in resolution of the television program, frame rate decrease, freezing of a frame, or an otherwise delayed or interrupted viewing experience. This will cause a decrease in the quality of the television viewing experience for the user 32b.

On the other hand a delay in other types of data such as programming guide data, web surfing data, email data, and many other kinds of data will not result in a significant disturbance to the user 32b. Accordingly, high-priority types of data such as video data can be sent from the wireless bridge circuit 30 with a higher priority than other types of data.

A particular example might be beneficial. Assume that another user wishes to watch a football game live on display 26b over the wireless connection. At the same time, another user in the home wishes to download a large software game or a movie. The large software game will take a large amount of data bandwidth that would slow the entire system down if it were broadcast over the same network. Thus, the software game is broadcast out on the second network, not on the first network. The second network can broadcast only when sufficient bandwidth becomes available that is not being used by the first network. If the first network enters a mode in which lower data rates are being broadcast, such as during an instant replay or while announcers are talking and the football play is not active, this will provide more bandwidth for a brief period of time for the other type of data, in this case a software game instead of a live video feed. Then, when the first type of data takes up more bandwidth to send correctly, the bandwidth of the second wireless network will be reduced accordingly.

As described previously, the wireless bridge circuit 30 can implement two wireless networks: a first wireless network is for transmitting high-priority data, while a second wireless network is for transmitting lower priority data. If the maximum bandwidth of the wireless bridge circuit 30 is approached, priority is given to the first wireless network. In this way the video content displayed on the television 26b will not be delayed or interrupted.

In one embodiment all data from the media content provider is transmitted over the first wireless network, while all data from the Internet 28 is transmitted over the second wireless network. Alternatively, only video data from the satellite transponder 24 is transmitted over the first wireless network.

In one embodiment video data from either the Internet or from the satellite transponder 24 are transmitted over the first wireless network, while all other types of data are transmitted over the second wireless network. Many other configurations are possible in which one type of data can be transmitted over the first wireless network while another type of data can be transmitted over the second wireless network.

While FIG. 2 has depicted a satellite media content distribution system 20, other types of media content distribution systems are possible. For example the media content distribution system 20 can be a cable television media content distribution system. The television receiver 22a can receive media content from a cable television provider. Television receiver 22a can also receive Internet data from the cable television provider.

The second television receiver 22b can include a second wireless bridge circuit incorporated therein to receive the wireless transmissions from the first television receiver 22a. Alternatively the second television receiver 22b can be coupled to a second wireless bridge circuit which receives the transmissions from the first television receiver 22a. Thus two wireless networks are set up between the wireless bridge circuit 30 and a second wireless bridge circuit 30b coupled to the second television receiver 22b.

Figure 3:
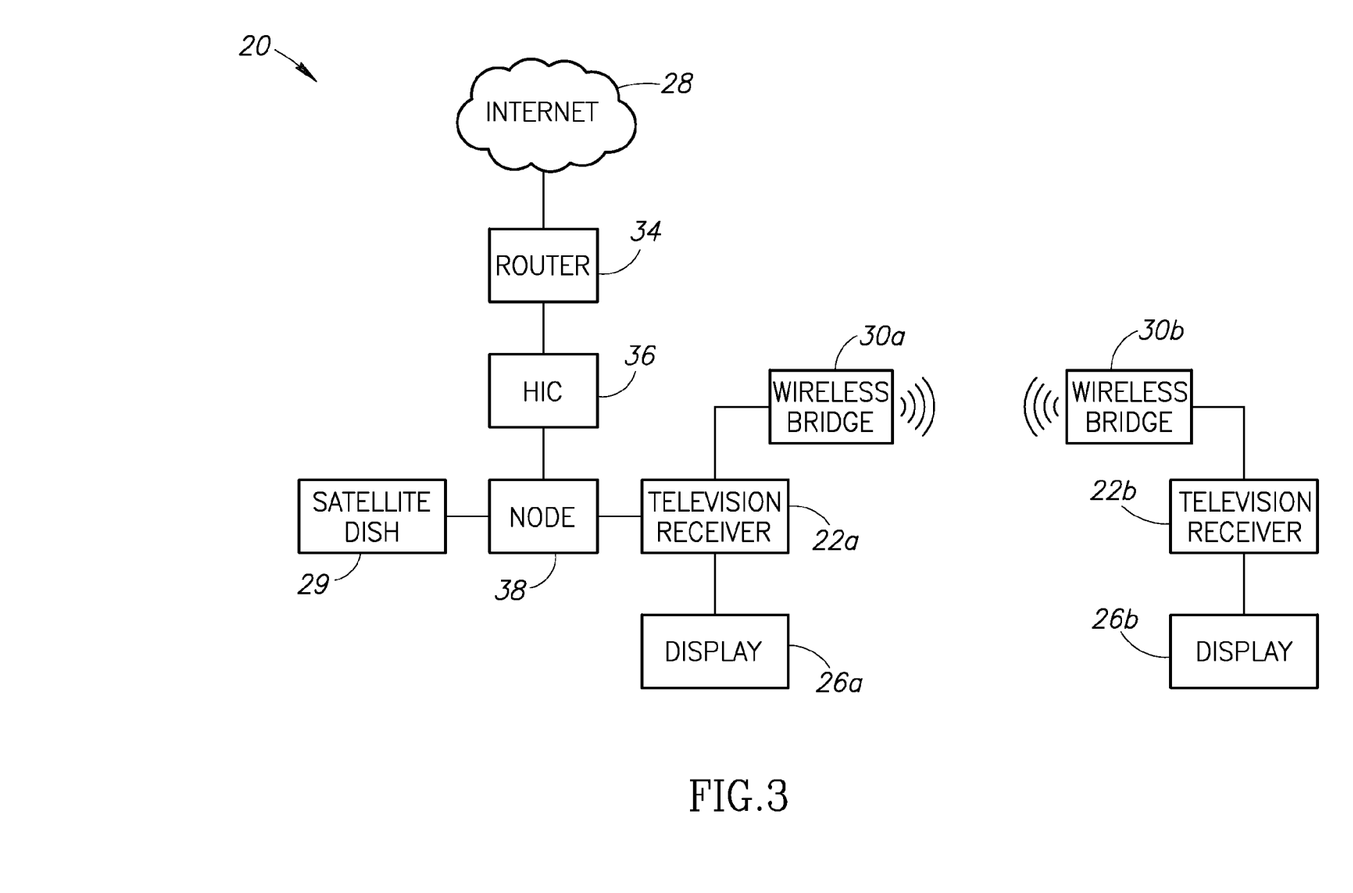
FIG. 3 is a block diagram of a media content delivery system according to one embodiment.

FIG. 3 illustrates a media content distribution system 20 according to one embodiment. The media content distribution system 20 of FIG. 3 includes a television receiver 22a which receives media content data from a satellite dish 29 and Internet data from the Internet 28. The satellite dish 29 is coupled to a node 38 which is further coupled to the television receiver 22a. The media content data from the satellite dish 29 is passed to the node 38 and from the node to the television receiver 22a. Internet data 28 is received by a router 34. The router 34 passes the Internet data to a headend interface converter (HIC) 36. The head end interface converter supplies the Internet data to the node 38 which supplies the Internet data to the television receiver 22a.

As described previously, the television receiver 22a transmits data to a second television receiver 22b. In particular the television receiver 22a supplies data to a Wi-Fi bridge circuit 30a which wirelessly transmits the data to a second Wi-Fi bridge circuit 30b coupled to the second television receiver 22b. The television receiver 22a therefore transmits media content data received from the satellite dish 29 and Internet data received from the Internet 28 to the second television receiver 22b.

As described previously, it is desirable to avoid interruption of video content being displayed on the display 26b. Two wireless networks are therefore established between the first and second wireless bridge circuits 30a and 30b. Higher priority data such as video content data is transmitted on a first wireless network while lower priority data is transmitted on the second wireless network. Higher bandwidth priority is given to the first wireless network than the second wireless network. If the maximum bandwidth of the Wi-Fi bridge circuits 30a and 30b is approached, the first wireless network has priority so the higher priority video content data will not be delayed or interrupted in favor of the lower priority data on the second wireless network. Alternatively, the types of data sent on the respective wireless networks can be determined according to other criteria.

While this description has primarily discussed data being transmitted from the first television receiver 22a to the second television receiver 22b, data is also transmitted from the second television receiver 22b to the first television receiver 22a. Both the first and the second television receiver's 22a, 22b assign data to be broadcast on either the first or the second wireless network via the respective wireless bridge circuits 30, 30b.

Figure 4:
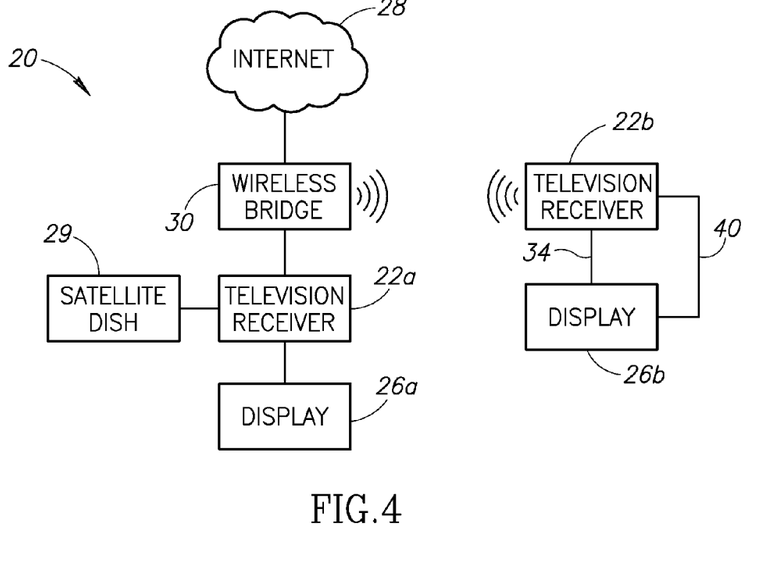
FIG. 4 is a block diagram of a media content delivery system according to an alternative embodiment.

FIG. 4 is a block diagram of a media content distribution system 20 according to an alternative embodiment. In FIG. 4 the television receiver 22a receives media content from a satellite dish 29. The television receiver 22a provides media content data to a wireless bridge circuit 30 which transmits the media content data to a second television receiver 22b as described previously. A wireless bridge circuit 30 is also connected to the Internet 28. The television receiver 22b can connect to the Internet 28 through the wireless bridge circuit 30 without going through the television receiver 22a. The television receiver 22b is coupled to a display 26b by a media output connection 39 and an Internet connection 40. The media output connection 39 is, for example, an HDMI cable, a coaxial cable, or any other suitable media output connection by which video content can be provided to the display 26b. The Internet connection 40 is, for example, an ethernet cable, a coaxial cable, or any other suitable cable. Alternatively the display 26b is connected to the television receiver 22b by only a single connection.

The wireless bridge circuit 30 transmits data to the television receiver 22b on two different wireless networks. The two different wireless networks have differing priority as described previously. On the first wireless network, the wireless bridge circuit 30 can supply high priority data. On the second wireless network, the wireless bridge circuit 30 can supply lower priority data. The first wireless network has higher bandwidth priority than the second wireless network. Thus higher priority data will not be interrupted due to a large volume of lower priority data. The first wireless network can have a first SSID while the second wireless network has a second SSID. Alternatively the two wireless networks can be implemented in a different suitable way.

Figure 5:
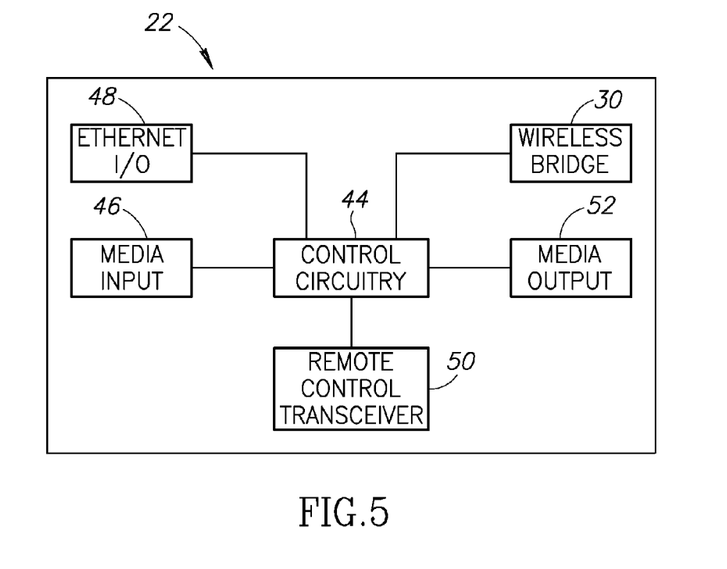
FIG. 5 is a block diagram of a television receiver according to one embodiment.

FIG. 5 is a block diagram of a television receiver 22a according to one embodiment. The television receiver 22a includes main control circuitry 44. The main control circuitry 44 can include one or more circuits such as multiple integrated circuits implemented on one or more printed circuit boards. The control circuitry 44 is coupled to a media input 46. The media input 46 receives media content data from a media content provider such as a satellite or cable television provider.

The control circuitry 44 is further coupled to ethernet circuitry 48. The ethernet circuitry 48 couples the control circuitry 44 to an Internet connection. Alternatively the ethernet connection 48 can be a different type of connection which allows the control circuitry 44 to be connected to the Internet 28.

The control circuitry 44 is further coupled to a remote control transceiver 50. The remote control transceiver 50 communicates with a remote control by which a user can control the television receiver 22a.

The control circuitry 44 is further coupled to a media output 52 by which media data can be supplied to a display 26. For example, television programs received from a media content provider 24 can be output to the television 26 by the media output 52.

The television receiver 22 further comprises a wireless bridge circuit 30. The wireless bridge circuit 30 is configured to transmit data wirelessly to another device. In particular, the control circuitry 44 supplies Internet data and media content data to the wireless bridge circuit 30 which then transmits the data to a second television receiver 22b as described previously.

The wireless bridge circuit 30 can establish two wireless networks having differing levels of bandwidth priority. Higher priority data can be transmitted on the first wireless network. Lower priority data can be transmitted on the second wireless network.

The second television receiver 22b, as described previously, can include generally similar components as those described in relation to the television receiver 22a. The second television receiver 22b can also include an ethernet port, control circuitry, a remote control transceiver, a wireless bridge circuit, and media output. The television receivers 22a, 22b can include many other components not described herein as understood by those of skill in the art.

Figure 6:
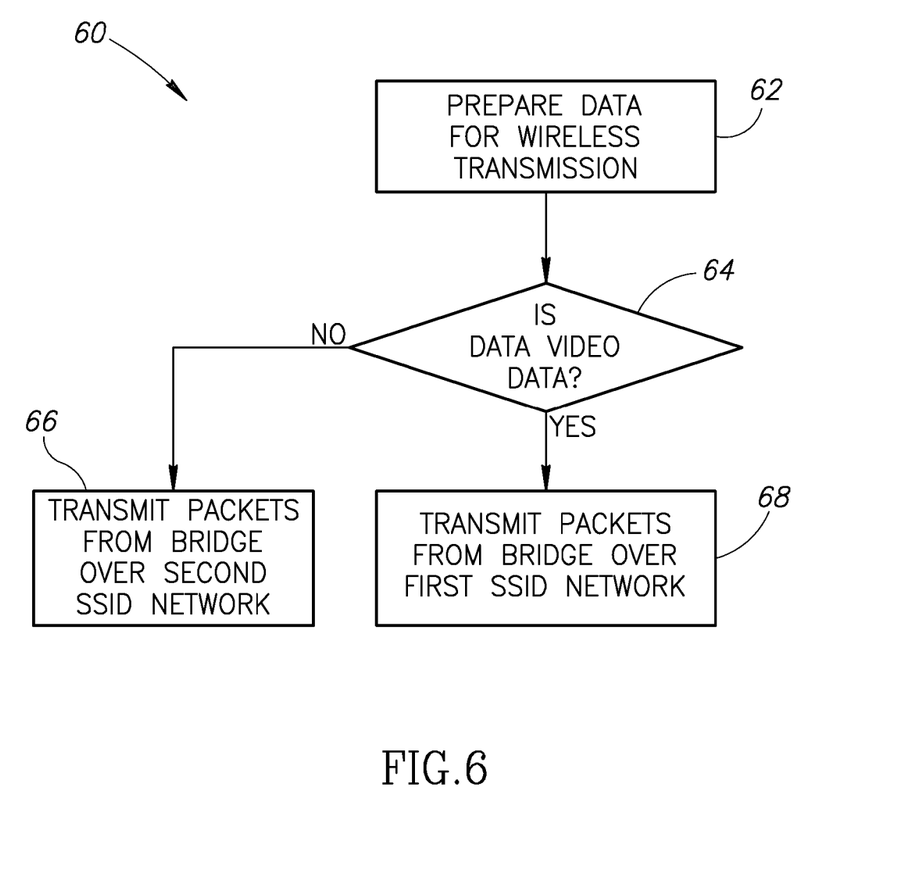
FIG. 6 is a flowchart of a process for delivering data over multiple wireless networks.

FIG. 6 is a flow diagram of a process 60 for transmitting data in a media content distribution system 20. At 62 data is prepared by a first television receiver 22a for wireless transmission. The data can be received from a media content provider and/or the Internet. Alternatively the data that is generated or stored locally in the first television receiver 22a.

At 64, the television receiver 22a determines if the data is video data, or another type of high priority data.

At 66, when the data is not video data or another kind of high priority data, the low priority data packets are transmitted from the bridge circuit 30a over a second SSID network.

At 68, when the data is video data or another kind of high priority data, the wireless bridge circuit 30a transmits the high priority data packets over the wireless bridge circuit 30a via the first SSID network. The first SSID network has a higher bandwidth priority than the second SSID network. This helps to ensure that there is no delay or interruption in high priority data such as video data at a second television receiver 22b. In this way video data being viewed by user 32b will not be subject to a downgrade in resolution, a delay, interruption, a reduction in frame rates, or any other type of disruption.

While the foregoing disclosure has disclosed a media content distribution system 20 primarily with regard to a satellite or cable television media content distribution system, principles of the present disclosure can be utilized in many other kinds of systems not involving television distribution system. Multiple wireless networks established by a single wireless bridge circuit and having different priorities to ensure continuity in high priority data can be utilized by many types of electronic devices as will be apparent to those of skill in the art in light of the present disclosure.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
receiving, by control circuitry within a first television receiver, internet data from the Internet;
receiving, by the control circuitry within the first television receiver, media data from a media content provider;
establishing, by a single wireless bridge circuit coupled to the control circuitry, a first, higher priority, wireless network having a first unique serial set identifier;
establishing, by the wireless bridge circuit, a second, lower priority, wireless network having a second unique serial set identifier, the first and second wireless networks providing separate communication paths between the first television receiver and a second television receiver;

transmitting, from the first television receiver to the second television receiver, via the wireless bridge circuit, the media data over the first wireless network and the Internet data over the second wireless network and automatically reducing bandwidth of the second wireless network and increasing bandwidth of the first wireless network, by the first and second television receivers, when a high data volume approaching maximum capacity is being transmitted across the first and second wireless networks.

2. The method of claim 1 wherein the media data includes video data.

3. The method of claim 2, further comprising:

receiving, in the second television receiver, video programs over the first wireless network; and displaying the video programs on a display coupled to the second television receiver.

4. A method, comprising:

receiving, by control circuitry within a first television receiver, media content from a media content provider;

establishing by a first wireless bridge circuit, a first wireless network between the first television receiver and a second wireless bridge circuit coupled to a second television receiver, the first wireless network having a first unique serial set identifier;

establishing a second wireless network between the first wireless bridge circuit and the second wireless bridge circuit, the second wireless network being separate from the first wireless network, the second wireless network having a second unique serial set identifier; and transmitting, by the first and second wireless bridge circuits, the media content from the first television receiver to a second television receiver, the transmitting including:

transmitting a first data type only over the first wireless network, the first wireless network being a higher priority wireless network, the first data type being media data from a from a media content provider;

transmitting a second data type only over the second wireless network the second wireless network being a lower priority wireless network, the second data type being internet data from the Internet, and automatically reducing bandwidth of the second wireless network and increasing bandwidth of the first wireless network, by the first and second television receivers, when a high data volume approaching maximum capacity is being transmitted across the first and second wireless networks.

5. The method of claim 4, further comprising providing more bandwidth for the first wireless network than for the second wireless network.

6. The method of claim 4 wherein the media content provider is a television service provider and the media content includes video content.

7. The method of claim 6, further comprising providing the video content from the second television receiver to a display coupled to the second television receiver.

8. A system, comprising:

a wireless bridge circuit;

a first television receiver coupled to the wireless bridge circuit;

a second television receiver coupled to the wireless bridge circuit;

a first wireless network having a unique first serial set identifier, the first wireless network established for transmitting higher priority data; and a second wireless network having a unique second serial set identifier, the second wireless established for transmitting lower priority data, the second television receiver configured to send to the first television receiver, via the wireless bridge circuit, a first type of data on the first wireless network, the first data type being media data from a from a media content provider, and a second type of data on the second wireless network, the second data type being internet data from the Internet, the first and second television receivers configured to automatically reduce bandwidth of the second wireless network and increase bandwidth of the first wireless network, when a high data volume approaching maximum capacity is being transmitted across the first and second wireless networks.

9. The system of claim 8 wherein the media data includes video data.

10. The system of claim 9 wherein the second television receiver is configured to send the video content to the first television receiver over the first wireless network.

* * * * *

UNITED STATES PATENT AND TRADEMARK OFFICE
CERTIFICATE OF CORRECTION

PATENT NO. : 9,930,401 B2
APPLICATION NO. : 13/732269
DATED : March 27, 2018
INVENTOR(S) : Anthony Kozlowski Page 1 of 1

It is certified that error appears in the above-identified patent and that said Letters Patent is hereby corrected as shown below:

In the Claims

Column 9, Line 38-39 Claim 4:
"the first data type being media data from a from a media content provider;" should read --the first data type being media data from a media content provider;--.

Column 10, Line 29-31 Claim 8:
"the first data type being media data from a from a media content provider;" should read --the first data type being media data from a media content provider;--.

Signed and Sealed this
Third Day of March, 2020

Andrei Iancu
*Director of the United States Patent and Trademark Office*